(12) United States Patent
Duong et al.

(10) Patent No.: US 11,639,666 B2
(45) Date of Patent: May 2, 2023

(54) STATOR WITH DEPRESSIONS IN GASPATH WALL ADJACENT LEADING EDGES

(71) Applicant: PRATT & WHITNEY CANADA CORP., Longueuil (CA)

(72) Inventors: Hien Duong, Mississauga (CA); Vijay Kandasamy, T. Palur (IN)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/466,208

(22) Filed: Sep. 3, 2021

(65) Prior Publication Data
US 2023/0072853 A1   Mar. 9, 2023

(51) Int. Cl.
*F01D 9/04* (2006.01)
*F01D 5/14* (2006.01)

(52) U.S. Cl.
CPC .......... *F01D 9/041* (2013.01); *F01D 5/141* (2013.01); *F05D 2220/323* (2013.01); *F05D 2240/12* (2013.01)

(58) Field of Classification Search
CPC ...... F01D 9/041; F01D 5/141; F05D 2220/32; F05D 2220/323
See application file for complete search history.

(56) References Cited

U.S. PATENT DOCUMENTS

| | | | |
|---|---|---|---|
| 8,469,659 B2 * | 6/2013 | Sakamoto | F01D 11/08 415/191 |
| 8,684,684 B2 * | 4/2014 | Clements | F01D 5/143 415/193 |
| 8,834,129 B2 * | 9/2014 | Barnes | F01D 5/34 416/193 A |
| 9,638,041 B2 * | 5/2017 | Brozyna | F01D 5/143 |
| 9,874,101 B2 * | 1/2018 | Xu | F01D 5/143 |
| 9,951,635 B2 | 4/2018 | Guemmer | |
| 10,221,710 B2 * | 3/2019 | Winn | F01D 9/041 |
| 10,415,392 B2 * | 9/2019 | Lohaus | F01D 5/147 |
| 10,584,604 B2 | 3/2020 | Guemmer | |
| 10,590,781 B2 * | 3/2020 | Correia | F01D 5/143 |

(Continued)

OTHER PUBLICATIONS

European Search Report issued in counterpart application 22193989.5 dated Oct. 25, 2022.

*Primary Examiner* — Juan G Flores
*Assistant Examiner* — Brian Christopher Delrue
(74) *Attorney, Agent, or Firm* — Norton Rose Fulbright Canada LLP

(57) ABSTRACT

A fluid machine for an aircraft engine has: first and second walls; a gaspath defined between the first wall and the second wall; a rotor having blades rotatable about the central axis; and a stator having: a row of vanes having airfoils including leading edges, trailing edges, pressure sides and suction sides opposed the pressure sides, and depressions defined in the first wall, the depressions extending from a baseline surface of the first wall away from the second wall, a depression of the depressions located circumferentially between a pressure side of the pressure sides and a suction side of the suction sides, the depression axially overlapping the airfoils and located closer to the suction side than to the pressure side, an upstream end of the depression located closer to a leading edge of the leading edges than to a trailing edge of the trailing edges.

17 Claims, 4 Drawing Sheets

(56) References Cited

U.S. PATENT DOCUMENTS

| | | | |
|---|---|---|---|
| 10,704,393 B2 | 7/2020 | Maatouk et al. | |
| 10,830,073 B2 | 11/2020 | Aggarwala | |
| 10,934,849 B2 | 3/2021 | Brettschneider et al. | |
| 10,968,749 B2* | 4/2021 | Shahpar | F23R 3/002 |
| 11,033,992 B2 | 6/2021 | Macfarlane et al. | |
| 2006/0233641 A1* | 10/2006 | Lee | F01D 5/143 |
| | | | 415/208.1 |
| 2009/0053066 A1 | 2/2009 | Iida | |
| 2010/0196154 A1 | 8/2010 | Sakamoto | |
| 2010/0284818 A1 | 11/2010 | Sakamoto | |
| 2012/0051894 A1 | 3/2012 | Clements et al. | |
| 2012/0051900 A1 | 3/2012 | Clements et al. | |
| 2013/0017095 A1* | 1/2013 | Lee | F01D 5/141 |
| | | | 416/239 |
| 2013/0224027 A1* | 8/2013 | Barr | F01D 5/145 |
| | | | 416/193 A |
| 2014/0090380 A1* | 4/2014 | Aggarwala | F04D 29/681 |
| | | | 416/189 |
| 2014/0169977 A1 | 6/2014 | Brettschneider et al. | |
| 2014/0348660 A1 | 11/2014 | Guendogdu et al. | |
| 2017/0226880 A1 | 8/2017 | Winn et al. | |
| 2018/0328185 A1 | 11/2018 | Maatouk et al. | |
| 2021/0017862 A1 | 1/2021 | Gustafson et al. | |
| 2021/0115798 A1* | 4/2021 | Gustafson | F01D 5/143 |

* cited by examiner

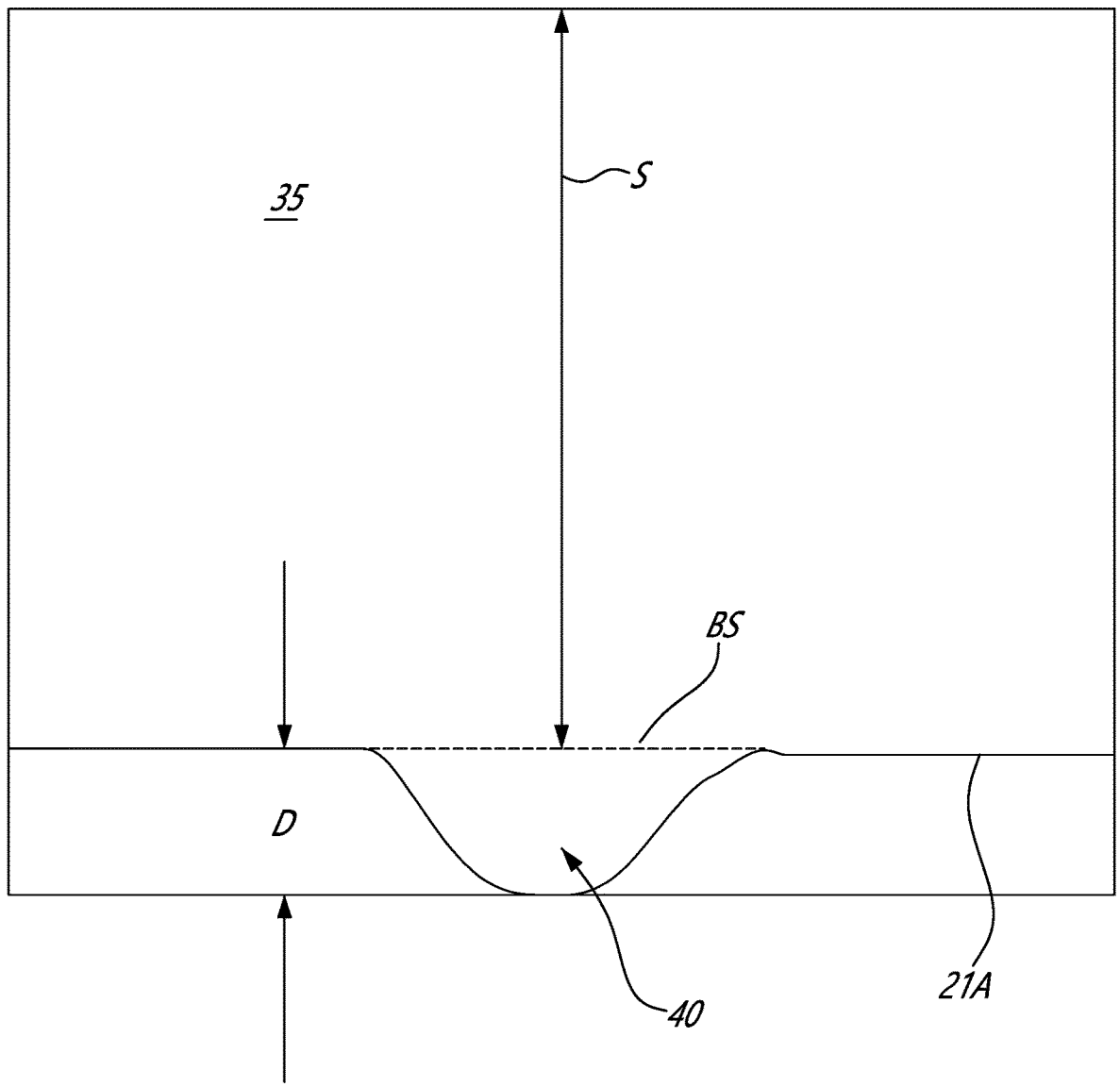

STATOR WITH DEPRESSIONS IN GASPATH WALL ADJACENT LEADING EDGES

TECHNICAL FIELD

The application relates generally to aircraft engines, such as gas turbine engines and, more particularly, to compressors and turbines of such engines.

BACKGROUND

Aircraft engines, such as gas turbine engines, comprise compressors that include one or more compressor stage. A typical compressor stage includes a stator having vanes and a rotor having blades. The rotor is rotatable relative to the stator. The stator is used to orient the flow such that the flow exiting the stator meets leading edges of the blades at an optimal angle of attack. In some operating conditions, the stator exhibit corner losses and secondary flows that may impair performance. Hence, improvements are sought.

SUMMARY

In one aspect, there is provided a fluid machine for an aircraft engine comprising: a first wall and a second wall circumferentially extending around a central axis; a gaspath defined between the first wall and the second wall; a rotor having blades circumferentially distributed around the central axis and extending cross the gaspath, the rotor rotatable about the central axis; and a stator in fluid communication with the rotor and having: a row of vanes extending across the gaspath and circumferentially distributed around the central axis, the vanes having airfoils including leading edges, trailing edges, pressure sides and suction sides opposed the pressure sides, and depressions defined in the first wall, the depressions extending from a baseline surface of the first wall away from the second wall, a depression of the depressions located circumferentially between a pressure side of the pressure sides and a suction side of the suction sides, the depression axially overlapping the airfoils and located closer to the suction side than to the pressure side, an upstream end of the depression located closer to a leading edge of the leading edges than to a trailing edge of the trailing edges.

The fluid machine may include any of the following features, in any combinations.

In some embodiments, a ratio of an axial length (h) of the depression taken along an axial direction relative to the central axis to an axial length (C) of the stator taken along the axial direction from the leading edges to the trailing edges ranges from 0.1 to 0.75.

In some embodiments, a ratio of a thickness (t) of the depression taken along a circumferential direction relative to the central axis to a pitch (p) of the stator extending along the circumferential direction from the leading edge of to an adjacent leading edge of the leading edges ranges from 0.05 to 0.5.

In some embodiments, a ratio of a distance (h1) taken along an axial direction relative to the central axis from the upstream end of the depression to the leading edge to an axial length (C) of the stator taken along the axial direction from the leading edges to the trailing edges ranges from −0.25 to 0.25.

In some embodiments, a ratio of a distance (h2) taken along an axial direction relative to the central axis from a downstream end of the depression to a trailing edge of the trailing edges to an axial length (C) of the stator taken along the axial direction from the leading edges to the trailing edges ranges from 0.25 to 0.75.

In some embodiments, a ratio of a depth (D) of the depression taken along a radial direction relative to the central axis to a span (S) of the airfoils ranges from 0.05 to 0.1.

In some embodiments, a thickness (t) of the depression taken along a circumferential direction relative to the central axis increases along a flow direction of a flow flowing between the airfoils.

In some embodiments, the depression is located closer to the suction side than to the pressure side.

In some embodiments, the depression extends substantially parallel to the suction side.

In some embodiments, the depression intersect a throat extending from the leading edge to an adjacent suction side of the suction sides.

In another aspect, there is provided an aircraft engine comprising: a compressor section having: a first wall and a second wall circumferentially extending around a central axis; a gaspath defined between the first wall and the second wall; a rotor having blades circumferentially distributed around the central axis and extending across the gaspath, the rotor rotatable about the central axis; and a stator in fluid communication with the rotor and having: a row of vanes extending across the gaspath and circumferentially distributed around the central axis, the vanes having airfoils including leading edges, trailing edges, pressure sides and suction sides opposed the pressure sides, and depressions defined in the first wall, the depressions extending from a baseline surface of the first wall away from the second wall, a depression of the depressions located circumferentially between a pressure side of the pressure sides and a suction side of the suction sides, the depression axially overlapping the airfoils and closer to the suction side than to the pressure side, an upstream end of the depression located closer to a leading edge of the leading edges than to a trailing edge of the trailing edges.

The aircraft engine may include any of the following features, in any combinations.

In some embodiments, a ratio of an axial length (h) of the depression taken along an axial direction relative to the central axis to an axial length (C) of the stator taken along the axial direction from the leading edges to the trailing edges ranges from 0.1 to 0.75.

In some embodiments, a ratio of a thickness (t) of the depression taken along a circumferential direction relative to the central axis to a pitch (p) of the stator extending along the circumferential direction from a leading edge of the leading edges to an adjacent leading edge of the leading edges ranges from 0.05 to 0.5.

In some embodiments, a ratio of a distance (h1) taken along the axial direction from the upstream end of the depression to the leading edge to the axial length (C) of the stator ranges from −0.25 to 0.25.

In some embodiments, a ratio of a distance (h2) taken along the axial direction from a downstream end of the depression to a trailing edge of the trailing edges to the axial length (C) of the stator ranges from 0.25 to 0.75.

In some embodiments, a ratio of a depth (D) of the depression taken along a radial direction relative to the central axis to a span (S) of the airfoils ranges from 0.05 to 0.1.

In some embodiments, the thickness of the depression increases along a flow direction of a flow flowing between the airfoils.

In some embodiments, the depression is located closer to the suction side than to the pressure side.

In some embodiments, the depression extends substantially parallel to the suction side.

In some embodiments, the depression intersects a throat extending from the leading edge to an adjacent suction side of the suction sides.

BRIEF DESCRIPTION OF THE DRAWINGS

Reference is now made to the accompanying figures in which:

FIG. 4 is a cross-sectional view of a depression defined in a gaspath wall of the stator of FIG. 2.

DETAILED DESCRIPTION

Figure 1:
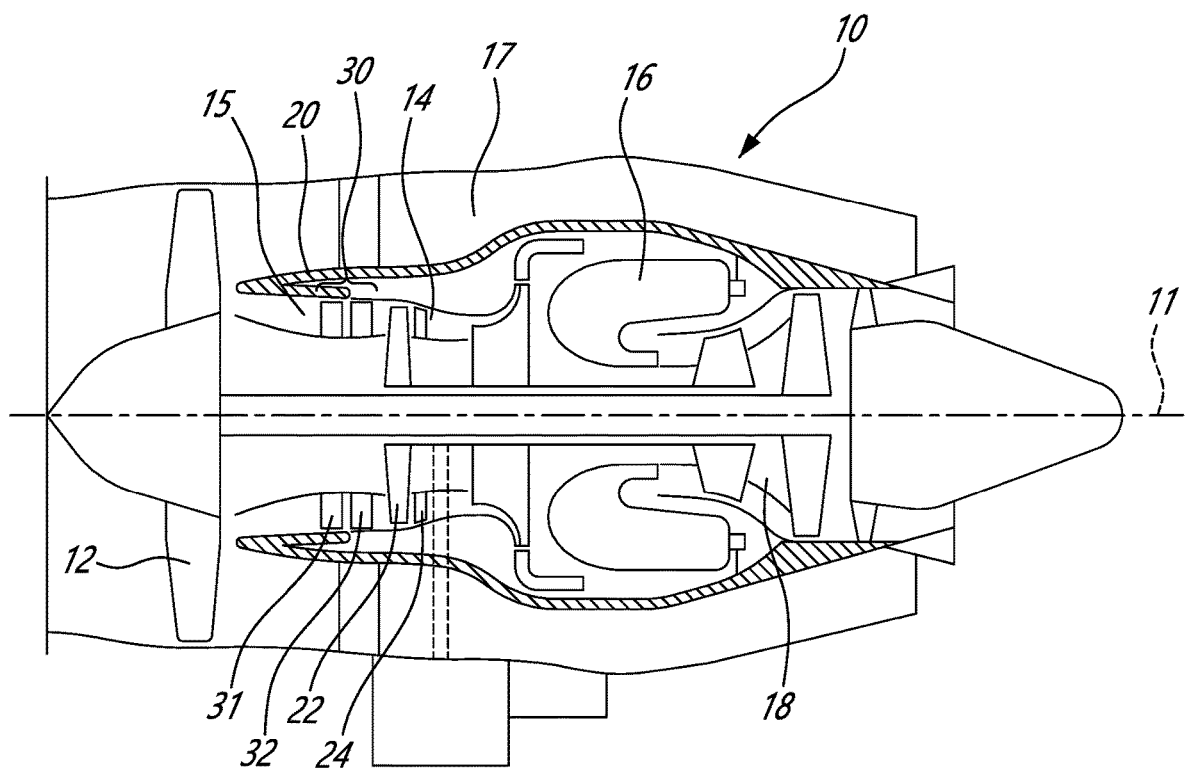
FIG. 1 is a schematic cross sectional view of an aircraft engine depicted as a gas turbine engine.

FIG. 1 illustrates an aircraft engine depicted as a gas turbine engine 10 of a type preferably provided for use in subsonic flight, generally comprising in serial flow communication a fan 12, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10. The principles of the present disclosure may apply to any gas turbine engine such as turboprop and turboshaft gas turbine engines.

The compressor section 14 includes one or more compressor rotors 22 and stators 24 in fluid communication with the rotors 22. The exemplary gas turbine engine 10 of FIG. 1 is a turbofan engine including the fan 12 through which ambient air is propelled. An airflow flowing between blades of the fan 12 is split between an engine core gaspath 15 and a bypass flow path 17 downstream of the fan 12. The gas turbine engine 10 has an engine casing 20 that circumferentially extends around the central axis 11. The core gaspath 15 is therefore located radially inwardly of the engine casing 20 relative to the central axis 11 and the bypass flow path 17 located radially outwardly of the engine casing 20 relative to the central axis 11.

As will be described in further detail below, the compressor section 14 of the gas turbine engine 10 includes at least one compression stage having a tandem stator assembly 30 (which may be alternately referred to as a dual stator assembly), composed of two individual stators, namely a first stator 31 and a second stator 32 in immediate flow-wise succession (i.e. without any rotor therebetween); the second stator 32 located downstream of the first stator 31 relative to the air flow flowing in the core gaspath 15. In the embodiment depicted in FIG. 1, the tandem stator assembly 30 is shown as being part of the first compression stage, that is it is located downstream of the fan 12 at the inlet of a core of the engine 10 and within the engine core gaspath 15. It is to be understood, however, that the present tandem stator assembly 30 may form part of other compression stages, such as those further downstream within the core of the gas turbine engine 10, either instead of or addition to being immediately downstream from the fan 12. In some embodiments, the tandem stator assembly 30 may be used in a turbine stage of the turbine section 18. The tandem stator 30 may be used in the bypass flow path 17.

Figure 2:
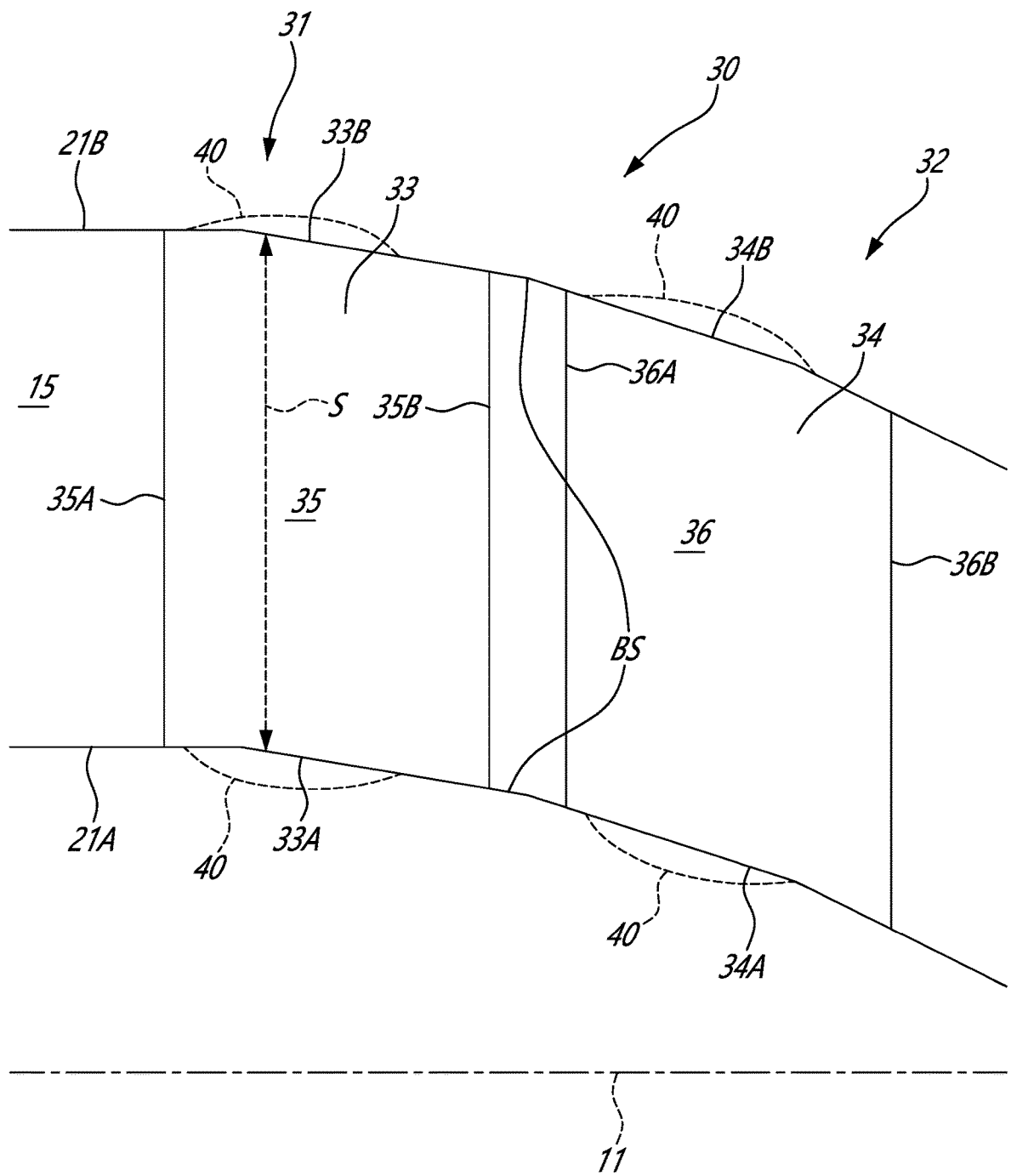
FIG. 2 is a schematic cross-sectional view of a portion of a compressor of the gas turbine engine of FIG. 1, the cross-sectional view taken on a plane containing a central axis of the gas turbine engine of FIG. 1.

Referring more particularly to FIG. 2, a portion of the compressor section 14 including the tandem stator 30 is shown in greater detail. The core gaspath 15 is defined radially between an inner gaspath wall 21A, which may include vane platforms (not shown), and an outer gaspath wall 21B, which may include vane shroud (not shown). The outer gaspath wall 21B is located radially outwardly of the inner gaspath wall 21A relative to the central axis 11.

The first stator 31 includes a first row of a plurality of first vanes 33 and the second stator 32 includes a second row of a plurality of second vanes 34. The first vanes 33 and the second vanes 34 are circumferentially distributed around the central axis 11. The first vanes 33 may be staggered relative to the second vanes 34. In other words, a circumferential position of each of the first vanes 33 may be between circumferential positions of two circumferentially adjacent ones of the second vanes 34. The first vanes 33 extend from first inner ends 33A at the inner gaspath wall 21A to first outer ends 33B at the outer gaspath wall 21B. The second vanes 34 extend from second inner ends 34A at the inner gaspath wall 21A to second outer ends 34B at the outer gaspath wall 21B.

Figure 3:
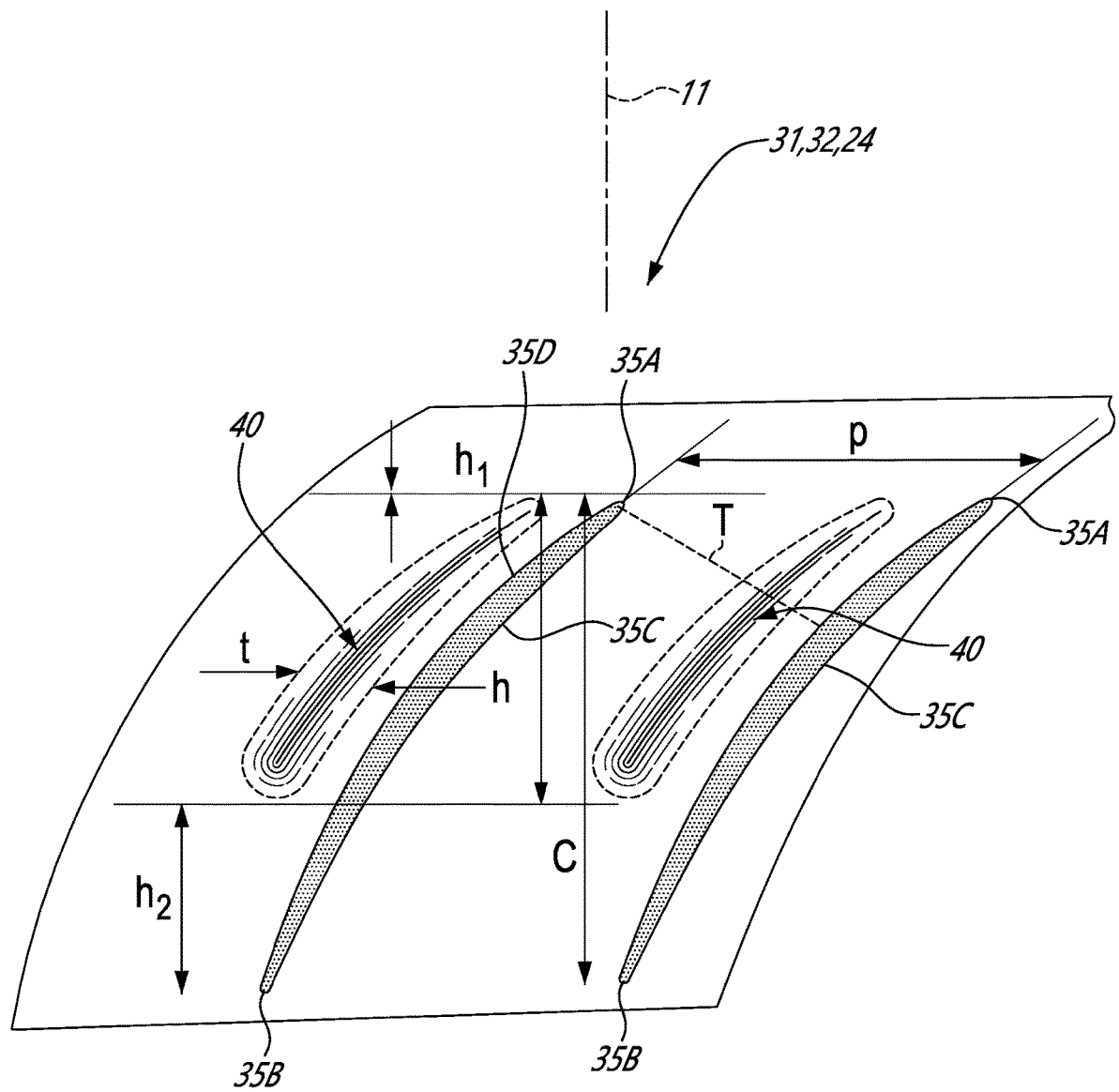
FIG. 3 is a schematic cross-sectional view of a stator of the compressor of the gas turbine engine of FIG. 1 taken on a plane normal to a radial direction relative to the central axis.

Referring to FIGS. 2-3, the first vanes 33 include first airfoils 35 having first leading edges 35A, first trailing edges 35B downstream of the first leading edges 35A, first pressure sides 35C (FIG. 3), and first suction sides 35D (FIG. 3) opposed the first pressure sides 35C. The first airfoils 35 extend in a direction having a radial component relative to the central axis 11 from the inner gaspath wall 21A to the outer gaspath wall 21B. The second vanes 34 include second airfoils 36 that extend in a direction having a radial component relative to the central axis 11 from the inner gaspath wall 21A to the outer gaspath wall 21B. The second airfoils 36 have second leading edges 36A, second trailing edges 36B downstream of the second leading edges 36A, second pressure sides, and second suction sides opposed the second pressure sides.

In the embodiment shown, the first airfoils 35 are offset from the second airfoils 36 such that the second leading edges 36A are located downstream of the first trailing edges 35B relative to the air flow flowing in the core gaspath 15. An axial offset is therefore defined between the second leading edges 36A and the first trailing edges 35B. In some embodiments, the first airfoils 35 may be at least partially axially overlapped by the second airfoils 36 such that the second leading edges 36A are located upstream of the first trailing edges 35B. In some embodiments, the second leading edges 36A may be axially aligned with the first trailing edges 35B.

In some operating conditions, for instance when the stator (e.g., first stator 31, second stator 32, stator 24) is highly loaded, corner loss may occur as a result of boundary layer build up. Large boundary layer build up toward trailing edges of the stator on suction sides may lead to high flow deviation and potential corner separation due to additional pressure side flow leakage across the trailing edge. This may result in flow deviation and wake shedding, which is undesirable.

Still referring to FIGS. 2-3, the tandem stator 30 includes depressions 40 that are defined in one or both of the inner gaspath wall 21A and the outer gaspath wall 21B. The depressions 40 extend from a baseline surface BS of the inner gaspath wall 21A and/or the outer gaspath wall 21B and away from the core gaspath 15. The baseline surface BS is a surface of the gaspath walls free of the depressions 40. As shown in FIG. 3, the depressions 40 are located circumferentially between the first pressure sides 35C and the first suction sides 35D.

Each of the first airfoils 35 may be axially overlapped by a respective one of the depressions 40. Similarly, each of the second airfoils 36 may be axially overlapped by a respective one of the depressions 40. Any stator of the compressor section 14 and/or any stator of the turbine section 18 may include the depressions 40. Both stators 31, 32 of the tandem stator 30 may include the depressions 40. In some embodiments, only one of the first and second stators 31, 32 of the tandem stator 30 includes the depressions 40.

Referring more particularly FIGS. 3-4, airfoils of one of the stators are shown in greater detail with their respective depressions 40. The description below refer to the first stator 31 and to the first airfoils 35. It will however be appreciated that the description below may apply to any stators of the gas turbine engine 10.

The depressions 40 run along the first suction sides 35D of the first airfoils 35. The depressions 40 may overlap a major portion (e.g., at least 50%) of a chord of the first airfoils 35. The depressions 40 may be located closer to the first suction sides 35D than to the first pressure sides 35C. A gap may be provided between the depressions 40 and the first suction sides 35D. A major portion (e.g. 50% or more) of the depressions 40 may be located upstream of a midchord location of the first airfoils 35. The depressions 40 extend from upstream ends to downstream ends. The upstream ends of the depressions 40 may be located closer to the first leading edges 35A than to the first trailing edges 35B. The upstream ends of the depressions 40 may be located upstream of the first leading edges 35A.

In the illustrated embodiment, a ratio of an axial length h of the depressions 40 taken along an axial direction relative to the central axis 11 to an axial length C of the first stator 31 taken along the axial direction from the first leading edges 35A to the first trailing edges 35B ranges from 0.1 to 0.75. A ratio of a thickness t of the depressions 40 taken along a circumferential direction relative to the central axis 11 to a pitch p of the first stator 31, which corresponds to a distance extending along the circumferential direction between two adjacent ones of the first leading edges 35A, may range from 0.05 to 0.5. A ratio of a distance $h_1$ taken along the axial direction relative to the central axis 11 from upstream ends of the depressions 40 to the first leading edges 35A to the axial length C of the first stator 31 taken along the axial direction from the first leading edges 35A to the first trailing edges 35B may range from −0.25 to 0.25. Hence, the upstream ends of the depressions 40 may be located upstream, downstream, or aligned with the first leading edges 35A. A ratio of a distance $h_2$ taken along the axial direction relative to the central axis 11 from downstream ends of the depressions 40 to the first trailing edge 35B to the axial length C of the first stator 31 may range from 0.25 to 0.75. A ratio of a depth D of the depressions 40 taken along a radial direction relative to the central axis 11 to a span S of the first airfoils 35 may range from 0.05 to 0.1. The depth D may extend from the baseline surface BS to deepest locations of the depressions 40. All of the above ratios may apply to any of the stators of the gas turbine engine that include the depressions 40.

As shown more clearly in FIG. 3, the thickness t of the depressions increases along a flow direction of a flow flowing between the first airfoils 35. The depressions 40 are located adjacent the first leading edges 35A. The depressions 40 may axially overlap the first leading edges 35A. The depressions 40 may be located closer to the first suction sides 35D than to the first pressure sides 35C. The depressions 40 may extend substantially parallel to the first suction sides 35D. In the embodiment shown, the depressions 40 intersect throats T that extend from the first leading edges 35A of one of the first airfoils 35 to the first suction side 35D of an adjacent one of the first airfoils 35. The depressions 40 may be asymmetrical with regards to plane containing the central axis 11 and intersecting a center of a space between the first vanes 33 and the second vanes 34. The depth D of the depressions 40 may be maximal where they intersect the throats T and may blend smoothly to the inner or outer gaspath walls 21A, 21B away from the location of maximal depth.

The depressions 40 may be located in vicinity of the leading edge of the stator proximate the suction side. The depressions 40 may contribute in lowering the local Mach number near the suction sides. This may help to reduce diffusion on the stator suction side. The decrease in the local Mach number through the throat may help to provide a gentler diffusion compared to a configuration devoid of such depressions 40. This may result in a reduction in the boundary layer buildup at the trailing edges of the stators and may induce smaller wake. Similar benefit may be observed on the pressure side where reduction in diffusion may help to reduce flow blockage. Large corner flow blockage may also be reduced thanks to the depressions 40 especially when the stator is operated near stall. The depressions 40 may contribute in reducing flow losses and may improve overall performance of the compressor and of downstream components. The depressions 40 as described herein may contribute in reducing stator corner loss and improve duct loss and entry conditions into downstream components.

The terms "downstream" and "upstream" as used herein are all with reference to a direction of the main airflow through the core gaspath 15. In the context of the present disclosure, the expression "fluid machine" includes compressors and turbines.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:
1. A fluid machine for an aircraft engine comprising:
a first wall and a second wall circumferentially extending around a central axis;
a gaspath defined between the first wall and the second wall;
a rotor having blades circumferentially distributed around the central axis and extending across the gaspath, the rotor rotatable about the central axis; and
a stator in fluid communication with the rotor and having:
a row of vanes extending across the gaspath and circumferentially distributed around the central axis, the vanes having airfoils including leading edges, trailing edges, pressure sides and suction sides opposed the pressure sides, and depressions defined in the first wall, the depressions extending from a baseline surface of the first wall away from the second wall, a depression of the depressions located circumferentially between a pressure side of the pressure sides and a suction side of the suction sides, the depression axially overlapping the airfoils and located closer to the suction side than to the pressure side, an upstream end of the depression located closer to a leading edge of the leading edges than to a trailing edge of the trailing edges, the depression intersecting a throat extending from the leading edge to an adjacent suction side of the suction sides.

2. The fluid machine of claim 1, wherein a ratio of an axial length (h) of the depression taken along an axial direction relative to the central axis to an axial length (C) of the stator taken along the axial direction from the leading edges to the trailing edges ranges from 0.1 to 0.75.

3. The fluid machine of claim 1, wherein a ratio of a thickness (t) of the depression taken along a circumferential direction relative to the central axis to a pitch (p) of the stator extending along the circumferential direction from the leading edge of to an adjacent leading edge of the leading edges ranges from 0.05 to 0.5.

4. The fluid machine of claim 1, wherein a ratio of a distance ($h_1$) taken along an axial direction relative to the central axis from the upstream end of the depression to the leading edge to an axial length (C) of the stator taken along the axial direction from the leading edges to the trailing edges ranges from −0.25 to 0.

5. The fluid machine of claim 1, wherein a ratio of a distance ($h_2$) taken along an axial direction relative to the central axis from a downstream end of the depression to a trailing edge of the trailing edges to an axial length (C) of the stator taken along the axial direction from the leading edges to the trailing edges ranges from 0.25 to 0.75.

6. The fluid machine of claim 1, wherein a ratio of a depth (D) of the depression taken along a radial direction relative to the central axis to a span (S) of the airfoils ranges from 0.05 to 0.1.

7. The fluid machine of claim 1, wherein a thickness (t) of the depression taken along a circumferential direction relative to the central axis increases along a flow direction of a flow flowing between the airfoils.

8. The fluid machine of claim 1, wherein the depression extends parallel to the suction side.

9. The fluid machine of claim 1, wherein the fluid machine is a compressor.

10. An aircraft engine comprising:
a compressor section having:
a first wall and a second wall circumferentially extending around a central axis;
a gaspath defined between the first wall and the second wall;
a rotor having blades circumferentially distributed around the central axis and extending across the gaspath, the rotor rotatable about the central axis; and
a stator in fluid communication with the rotor and having:
a row of vanes extending across the gaspath and circumferentially distributed around the central axis, the vanes having airfoils including leading edges, trailing edges, pressure sides and suction sides opposed the pressure sides, and
depressions defined in the first wall, the depressions extending from a baseline surface of the first wall away from the second wall, a depression of the depressions located circumferentially between a pressure side of the pressure sides and a suction side of the suction sides, the depression axially overlapping the airfoils and closer to the suction side than to the pressure side, an upstream end of the depression located closer to a leading edge of the leading edges than to a trailing edge of the trailing edges, the depression intersecting a throat extending from the leading edge to an adjacent suction side of the suction sides.

11. The aircraft engine of claim 10, wherein a ratio of an axial length (h) of the depression taken along an axial direction relative to the central axis to an axial length (C) of the stator taken along the axial direction from the leading edges to the trailing edges ranges from 0.1 to 0.75.

12. The aircraft engine of claim 11, wherein a ratio of a thickness (t) of the depression taken along a circumferential direction relative to the central axis to a pitch (p) of the stator extending along the circumferential direction from a leading edge of the leading edges to an adjacent leading edge of the leading edges ranges from 0.05 to 0.5.

13. The aircraft engine of claim 12, wherein a ratio of a distance ($h_1$) taken along the axial direction from the upstream end of the depression to the leading edge to the axial length (C) of the stator ranges from −0.25 to 0.

14. The aircraft engine of claim 13, wherein a ratio of a distance ($h_2$) taken along the axial direction from a downstream end of the depression to a trailing edge of the trailing edges to the axial length (C) of the stator ranges from 0.25 to 0.75.

15. The aircraft engine of claim 14, wherein a ratio of a depth (D) of the depression taken along a radial direction relative to the central axis to a span (S) of the airfoils ranges from 0.05 to 0.1.

16. The aircraft engine of claim 15, wherein the thickness of the depression increases along a flow direction of a flow flowing between the airfoils.

17. The aircraft engine of claim 16, wherein the depression extends parallel to the suction side.

* * * * *